(12) United States Patent
Roth

(10) Patent No.: US 6,919,051 B1
(45) Date of Patent: Jul. 19, 2005

(54) LOW PROFILE, INTEGRATED CATALYTIC CONVERTER AND FLEXIBLE COUPLING ASSEMBLY

(75) Inventor: Gregory Thomas Roth, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 798 days.

(21) Appl. No.: 09/631,247

(22) Filed: Aug. 2, 2000

Related U.S. Application Data
(60) Provisional application No. 60/147,023, filed on Aug. 3, 1999.

(51) Int. Cl.[7] .............................. B01D 53/34; F01N 3/28
(52) U.S. Cl. ...................... 422/179; 422/177; 422/180; 29/890; 285/226; 285/227
(58) Field of Search ................................ 422/171, 177, 422/179, 180; 60/299; 29/890; 285/49, 62, 226–227

(56) References Cited

U.S. PATENT DOCUMENTS

| | | | |
|---|---|---|---|
| 5,878,567 A | 3/1999 | Adamczyk, Jr. et al. | 60/274 |
| 5,967,565 A | 10/1999 | Kim | 285/49 |
| 5,971,439 A | 10/1999 | Cwik | 285/49 |
| 5,988,308 A | 11/1999 | Qutub | 180/309 |
| 5,992,896 A | 11/1999 | Davey et al. | 285/49 |
| 6,151,893 A | * 11/2000 | Watanabe et al. | 60/322 |
| 6,338,827 B1 | 1/2002 | Nelson | 422/186.04 |
| 6,354,903 B1 | 3/2002 | Nelson | 29/890 |
| 6,361,821 B1 | 3/2002 | Anderson et al. | 427/58 |
| 6,391,822 B1 | 5/2002 | Dou et al. | 502/325 |
| 6,455,463 B1 | 9/2002 | Labarge et al. | 502/340 |
| 6,464,945 B1 | 10/2002 | Hemingway | 422/174 |
| 6,624,113 B2 | 9/2003 | Labarge et al. | 502/344 |
| 6,643,928 B2 | 11/2003 | Hardesty et al. | 29/890 |

* cited by examiner

Primary Examiner—Hien Tran
(74) Attorney, Agent, or Firm—Paul L. Marshall

(57) ABSTRACT

A low-profile integrated catalytic converter with a coupling assembly comprises a catalytic converter with a coupling assembly integrated into the inlet end of the catalytic converter, which is attached to a mounting flange or exhaust pipe. The coupling assembly comprises two or more flexible bellows, joined together at their periphery, and containing a plurality of undulating ribs. The respective ends of the flexible bellows assembly are secured to the catalytic converter. A coupling travel limiter can optionally be concentrically disposed within the bellows assembly to limit the flexibility of the coupling and direct an exhaust gas stream into the catalytic converter.

21 Claims, 4 Drawing Sheets

US 6,919,051 B1

LOW PROFILE, INTEGRATED CATALYTIC CONVERTER AND FLEXIBLE COUPLING ASSEMBLY

Application claims benefit of 60/147,023 Aug. 3, 1999.

TECHNICAL FIELD

The invention relates to catalytic converters for mobile vehicles and, more particularly, to an apparatus and method for manufacturing a low profile, integrated catalytic converter and flexible coupling.

BACKGROUND OF THE INVENTION

Catalytic converters are devices incorporated into a mobile vehicle's exhaust system that reduce the amount of pollutants found in exhaust gases to environmentally harmless levels. The catalytic converter is placed under strenuous operating conditions due to experiencing constant vibrational and oscillating motions, axial and torsional loads, exposure to exhaust gas pollutants, temperature gradients of approximately 1,000° C. or more, corrosion, and other typical conditions.

Conventional catalytic converters can experience strain-induced fatigue due to constant vibrational and oscillating motions, axial and torsional loads, and thermal stress during operation. Some conventional exhaust systems for mobile vehicles employ existing flex coupling assemblies that decouple the exhaust system from the engine and/or from other exhaust system components. These assemblies are designed and manufactured separately from the catalytic converter and other exhaust system components. However, the exhaust system typically experiences several adverse effects stemming from these conventional flex coupling components. Adverse effects, such as exhaust gas stream flow restrictions, increased weight of the exhaust system, and additional costs associated with the additional components, are typically attributable to the existing flex coupling components. In addition, with emissions regulations becoming more stringent, catalytic converters are also being designed to attach to exhaust manifold assemblies. Exhaust manifold assemblies are typically mounted to pipes leading from the engine compartment. As a result, exhaust manifold assemblies are taking up space in the engine compartment as well as the exhaust system. Consequently, valuable underhood packaging space is becoming scarce.

Accordingly, there exists a need for an apparatus and method for manufacturing a catalytic converter having an integrated flexible coupling device.

SUMMARY OF THE INVENTION

The drawbacks and disadvantages of the prior art are overcome by the exemplary embodiment of the flexible coupling assembly, integrated catalytic converter/flexible coupling assembly, and methods for making, and method for treating exhaust gas of the present invention. The flexible coupling assembly comprises a first flexible bellow comprising an inlet and a plurality of undulating ribs concentrically radiating outward from the inlet to a first periphery and a second flexible bellow comprising an outlet and a plurality of undulating ribs concentrically radiating outward from the outlet to a second periphery, wherein the first flexible bellow and the second flexible bellow are secured at the first and second periphery to form a bellows assembly such that the inlet and the outlet are in fluid communication. Disposed within the bellows assembly is a travel limiter which extends at least from a portion of the inlet to a portion of the outlet.

The method for manufacturing the integrated catalytic converter/flexible coupling assembly comprises: forming a catalyst substrate comprising a catalyst, disposing the catalyst substrate concentrically within a shell having an end, and disposing the mat support material concentrically in between the catalyst substrate and the shell. Meanwhile, a flexible coupling assembly is formed comprising a first bellow with an inlet and a plurality of undulating first ribs concentrically radiating outward from the inlet to a first periphery, and a second bellow comprising an outlet and a plurality of undulating second ribs concentrically radiating outward from the outlet to a second periphery, wherein the first flexible bellow and the second flexible bellow are secured at the first and second periphery to form a flexible coupling assembly such that the inlet and the outlet are in fluid communication. The catalytic converter is then secured to the outlet of the coupling assembly.

Finally, the method for treating exhaust gas comprises using the integrated catalytic converter/flexible coupling assembly. The inlet of the assembly is mounted to an exhaust system component, such that the inlet and exhaust system component are in fluid communication. Exhaust gas is introduced to the exhaust system wherein the exhaust gas passes from the exhaust system through the coupling assembly and through the catalytic converter. When vibration is imparted to the assembly, the coupling assembly adsorbing the vibration.

The above-described and other features and advantages of the present invention will be appreciated and understood by those skilled in the art from the following detailed description, drawings, and appended claims.

BRIEF DESCRIPTION OF THE DRAWINGS

For a further understanding of the nature of the present invention, as well as other features and advantages thereof, reference should be made to the following detailed description taken in conjunction with the accompanying drawings, which are meant to be exemplary, not limiting, and wherein like elements are numbered alike in the several figures.

DESCRIPTION OF THE PREFERRED EMBODIMENT

Figure 1:
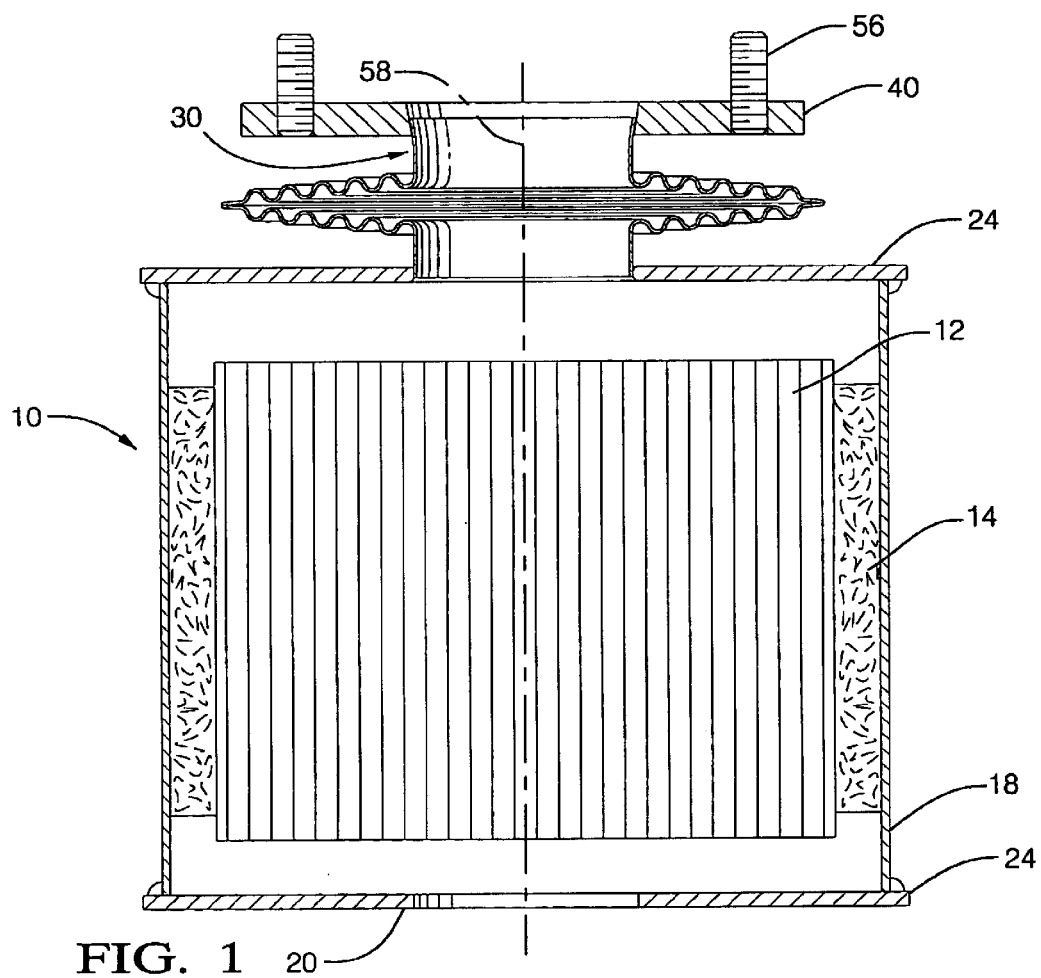
FIG. 1 is a cross-sectional view of an exemplary embodiment of a catalytic converter integrated with a coupling assembly of the present invention.

A low-profile integrated catalytic converter and coupling assembly comprises a coupling assembly integrated into the inlet and/or outlet end of the catalytic converter, which is attached to a mounting flange or exhaust pipe. The coupling assembly comprises two or more flexible bellows joined together at their periphery. One opening of the flexible bellows assembly is secured to a catalytic converter with the opposite opening secured to a mounting flange or a connecting pipe, which is further secured to an exhaust pipe, an exhaust manifold assembly, or other exhaust system component. A coupling travel limiter, comprising a cylinder, can optionally be disposed concentrically within the coupling assembly to limit the maximum displacement of the coupling assembly and direct an exhaust gas stream into or out of the catalytic converter during its operation.

A catalytic converter for a mobile vehicle can catalytically treat exhaust gas streams using a catalyst disposed on a catalyst substrate. The catalyst substrate can comprise any material designed for use in a spark ignition or diesel engine environment, and have the following characteristics: (1) capable of operating at temperatures up to about 1,000° C., (2) capable of withstanding exposure to hydrocarbons, nitrogen oxides, carbon monoxide, carbon dioxide, and/or sulfur, and other exhaust gas constituents; and (3) having sufficient surface area and structural integrity to support the desired catalyst. Some possible materials include cordierite, silicon carbide, metallic foils, alumina sponges, porous glasses, and the like, and mixtures comprising at least one of the foregoing. Some ceramic materials include "HONEY CERAM", commercially available from NGK-Locke, Inc, Southfield, Mich., and "CELCOR", commercially available from Corning, Inc., Corning, N.Y.

Although the catalyst substrate can have any size or geometry, the size and geometry are preferably chosen to optimize the surface area in the given converter design parameters. Typically, the catalyst substrate has a honeycomb geometry, with the combs being any multi-sided or rounded shape, with substantially square, hexagonal, octagonal or similar geometries preferred due to the ease of manufacturing and increased surface area.

Disposed on and/or throughout the catalyst substrate is a catalyst for converting exhaust gasses to acceptable emissions levels as is known in the art. The catalyst may comprise one or more catalyst materials that are wash coated, imbibed, impregnated, physisorbed, chemisorbed, precipitated, or otherwise applied to the catalyst substrate. Possible catalyst materials include noble metals, such as platinum, palladium, rhodium, iridium, osmium and ruthenium; other metals, such as tantalum, zirconium, yttrium, cerium, nickel, copper, and the like; metal oxides; and mixtures and alloys comprising at least one of the foregoing, and other conventional catalysts.

Located in between the catalyst substrate and a catalytic converter shell is a mat support material that insulates the shell from both the high exhaust gas temperatures and the exothermic catalytic reaction occurring within the catalyst substrate. The mat support material, which enhances the structural integrity of the catalyst substrate by applying compressive radial forces about it, reducing its axial movement, and retaining it in place, is concentrically disposed around the catalyst substrate to form a mat support material/catalyst substrate subassembly. The mat support material can either be an intumescent material, e.g., one which contains ceramic materials, and other conventional materials such as an organic binder and the like, or combinations comprising at least one of the foregoing, and a vermiculite component that expands with heating to maintain firm uniform compression when the shell expands outward from the catalyst substrate, or a non-intumescent material, which does not contain vermiculite, as well as materials which include a combination of both. Typical non-intumescent materials include materials sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials include materials sold under the trademark "INTERAM" by the "3M" Company, Minneapolis, Minn., as well as those intumescents which are also sold under the aforementioned "FIBERFRAX" trademark, as well as combinations thereof and others.

The mat support material/catalyst substrate subassembly can be concentrically disposed within shell. The shell includes at least one opening for the passage of an exhaust gas stream through the catalyst converter. The opening(s) at the ends of the shell can be formed integrally with the shell or an end cone, an end plate, or the like, can be concentrically fitted about the opening to secure the shell and to provide a gas tight seal. The choice of material for the shell depends upon the type of exhaust gas, the maximum temperature reached by the catalyst substrate, the maximum temperature of the exhaust gas stream, and the like. Suitable materials for the shell can comprise any material that is capable of resisting under-car salt, temperature and corrosion. Typically, ferrous materials are employed such as ferritic stainless steels. Ferrous materials, and the like, include the 400-Series such as SS-409, SS-439, and SS-441, with grade SS-409 generally preferred.

Referring generally to FIGS. 1–5, a catalytic converter 10 can preferably be attached to a coupling assembly 30. Coupling assembly 30 comprises a first bellow 34 and a second bellow 36 assembled back-to-back and coupled at their respective periphery 38 and 38'. The first bellow 34 of the flexible coupling assembly 30 is attached to the converter 10 via endplate 24. Likewise, the second bellow 36 of the flexible coupling assembly 30 is attached to a mounting flange 40 or a connecting pipe (not shown), which is attached to an exhaust system component such as an exhaust manifold assembly or an exhaust pipe (not shown).

Figure 3:
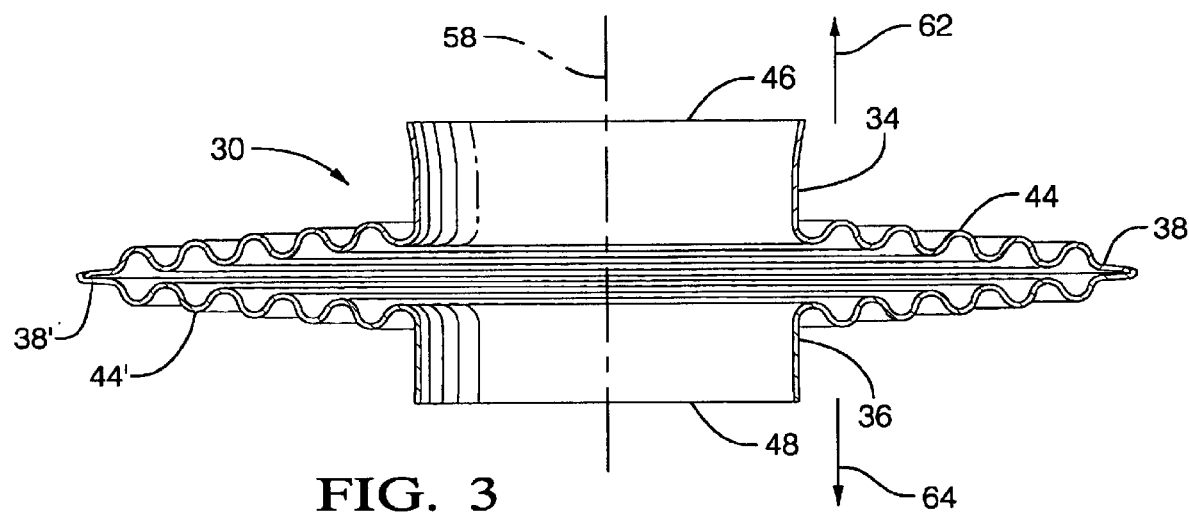
FIG. 3 is a cross-sectional view of an exemplary embodiment of a bellows assembly of the present invention.
Figure 4:
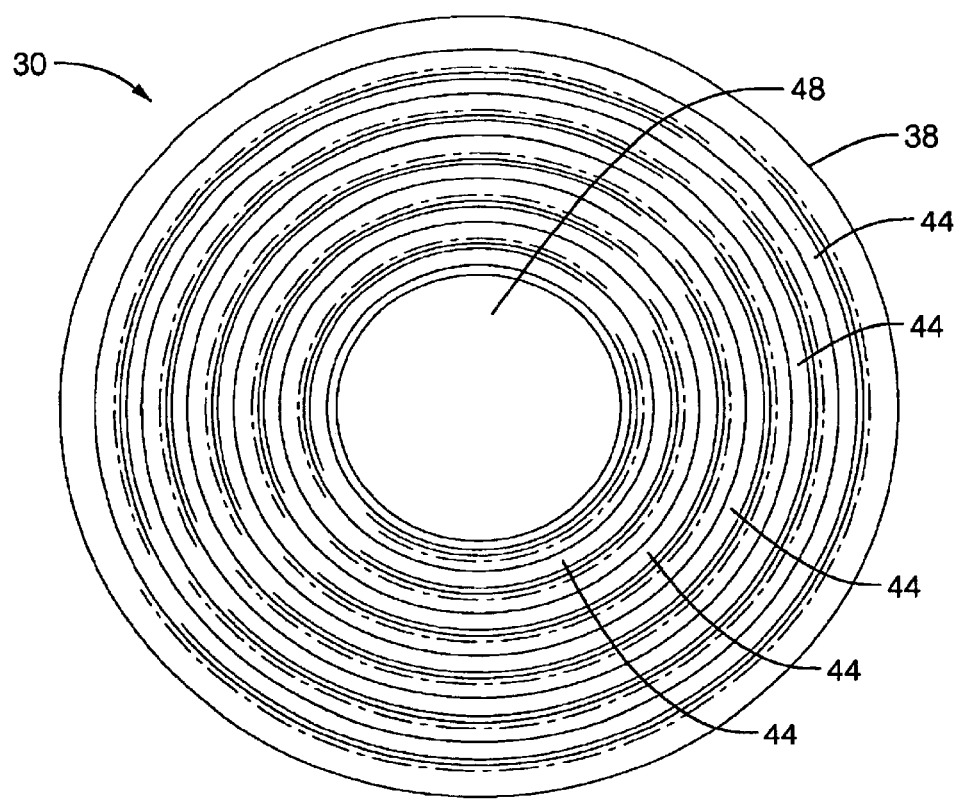
FIG. 4 is an end view of one exemplary embodiment of the bellows assembly of the present invention.
Figure 5:
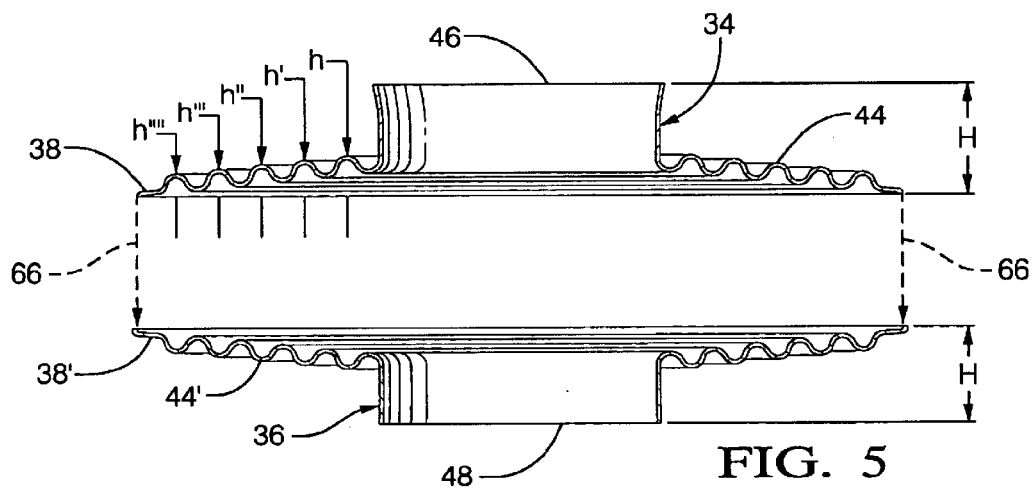
FIG. 5 is a cross-sectional view of an exemplary embodiment of a first bellow and a second bellow forming the bellows assembly of the present invention.

Referring specifically now to FIGS. 3–5, coupling assembly 30 can preferably include two or more flexible bellows 34, 36, whereby each bellow comprises a cross-sectional geometry, such as oval, circular, triangular, square, rectangular, pentagonal, hexagonal, septagonal, octagonal, and the like, with a circular geometry preferred. First and second bellows 34, 36 can include one or more first ribs 44, and second ribs 44', respectively, concentrically radiating outward from an inlet 46 and an outlet 48, respectively. Inlet 46 and outlet 48 can project from bellows 34, 36, respectively, in a direction opposite each other, as indicated by arrows 62 and 64, respectively. The ribs 44, 44' can form the undulating shape of the bellows 34, 36, which facilitates the flexible movement of the coupling assembly 30. Both inlet 46 and outlet 48 can have a geometry, such as circular, oval, multi-sided, and the like, that compliments the geometry of the catalytic converter, conduit, pipe, a mounting flange, or other exhaust system component to which the coupling assembly is connected to, accordingly.

In FIGS. 1–6, each bellow 34, 36 is illustrated as having five ribs 44, 44'. However, the number of ribs 44, 44' can be increased or decreased according to the requirements of specific application of the coupling assembly 30. For example, the flexibility of bellows 34, 36 can be increased or decreased by increasing or decreasing both the number of ribs 44, 44' and their heights h, h', h'', h''', and h'''' for each individual rib 44, 44', respectively, of each bellow 34 and 36 (See FIG. 5).

Figure 2:
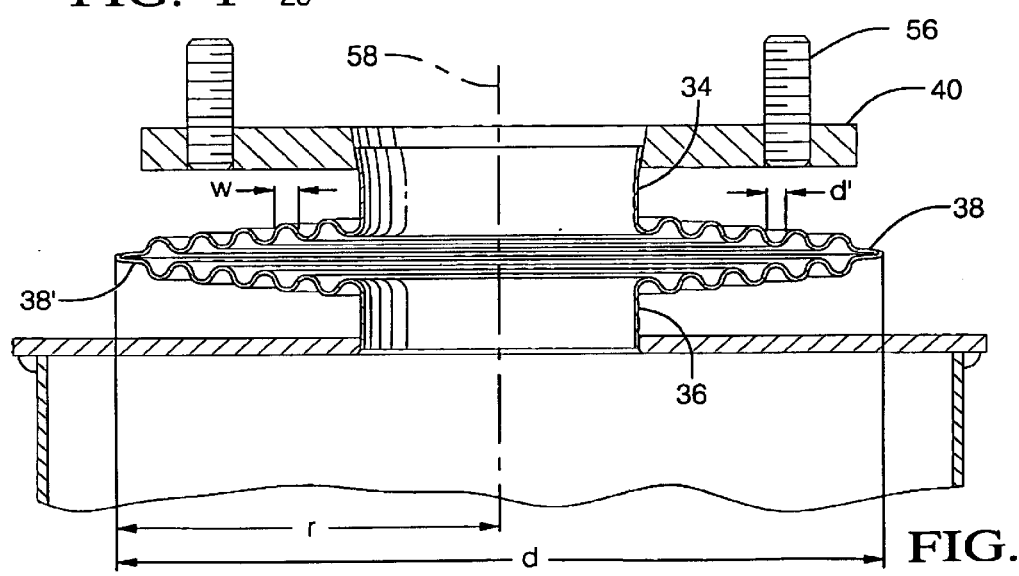
FIG. 2 is an expanded partial cross-sectional view of the integrated catalytic converter with the coupling assembly of FIG. 1.

Each rib 44, 44' can also be increased or decreased in width "w" while the radius "r" of its respective bellow 34,

36 can remain constant, increase, or decrease incrementally, or in proportion to the width "w" (See FIG. 2). Furthermore, the distance "d'" between each rib 44, 44' can be adjusted as the number of ribs 44 increase, decrease or remain constant (See FIG. 2). In addition, in an exemplary embodiment of bellows 34, 36, shown in FIG. 5, each bellow 34, 36 can preferably have a height "H" of about 1.27 mm (0.050 inches) to approximately about 5.10 mm (2.00 inches), and, more specifically, approximately about 6.40 mm (0.250 inches) to approximately about 38.10 mm (1.50 inches) especially preferred.

The choice of material for bellows 34, 36 depends upon the type of exhaust gas, the maximum temperature of the exhaust gas stream, mounting location, system loads, vibrational loads, and the like. Suitable materials for bellows 34, 36 can comprise any material that is capable of resisting under-car salt, temperature, corrosion, and high stress levels. Typically, a ferrous material is employed such as high strength ferritic stainless steels. Ferrous materials include the 400-Series such as SS-409, SS-439, and SS-441, as well as the 300 series such as SS-304 and SS-316, and "INCONEL", commercially available from Gibbs Wire & Steel Co., Inc. Charlotte, N.C., and the like, with "INCONEL" generally preferred.

The bellows 34, 36 can preferably be formed and manufactured using conventional sheet metal forming processes such as using a stamping die having preformed ribs to create ribs 44, 44', inlet 46, and outlet 48 (See FIGS. 3–5). Each bellow 34, 36 can preferably have a cross-sectional geometry that can flex upon application of axial and torsional vibrational loads.

As shown in FIG. 5, the bellows 34, 36 can be joined by exerting a force in the general direction of arrow 66 towards peripheries 38, 38' to form a gas-tight seal. The mechanical bond can define a joint configuration such as a lap joint, butt joint, tee joint, or the like, as well as combinations comprising at least one of the foregoing joints, which can be sealed mechanically or by a weld, crimp, lockseam, or the like, or by a combination comprising at least one of the foregoing seals. More specifically, and preferably, an edge weld can be disposed concentrically about the peripheries 38, 38' of the bellows 34, 36, respectively.

In another exemplary embodiment, the flexible coupling assembly 30 can be rotatably attached to the mounting flange 40 at inlet 46 and/or to the catalytic converter 10 at outlet 48. The attachment can be, for example, a tongue and groove joint, an electronically controlled actuator and sensor configuration, or any attachment permitting the flexible coupling assembly 30 to rotate within the mounting flange 40. When a torque generated by the engine is adsorbed by the flexible engine mounts, the engine can "roll" several degrees about is roll center, which is commonly known to those skilled in the art as "engine roll". A rotatably attached flexible coupling assembly 30 can adsorb the force exerted by the engine roll by rotating itself and the catalytic converter several degrees in either a clockwise, counter-clockwise, or in both directions about its axis 58. The amount of rotational freedom of movement can preferably be up to about 25θ preferred, and about 5θ to about 10° especially preferred.

Essentially, the coupling assembly's freedom of movement about its axis 58 enables it to accommodate exhaust system movement caused by engine roll, engine vibration, exhaust system vibration, and exhaust system thermal expansion. Furthermore, the coupling assembly 30 can also isolate the integrated catalytic converter from engine vibration, which, in turn, reduces the amount of audible noise produced by the catalytic converter.

Certain applications, compared to others, require the catalytic converter to move in a limited range. Accordingly, the coupling assembly's flexibility can be limited. The coupling assembly 30 can also comprise a coupling travel limiter 42 (See FIGS. 6–7). The coupling travel limiter 42 limits the maximum displacement of the coupling assembly 30 according to the requirements and specifications of the particular application. In addition to limiting the mobility and flexibility of the coupling assembly 30, the coupling travel limiter 42 also directs the exhaust gas stream flow into the catalytic converter using an outwardly flared end 52. As a result, the exhaust gas stream experiences less turbulence while flowing into the catalytic converter, which decreases the expansion loss coefficient and the resulting backpressure forming within the coupling assembly and catalytic converter. In addition, due to the coupling travel limiter 42 positioning within the coupling assembly 30, the coupling travel limiter 42 insulates the coupling assembly 30 from the heat of the exhaust gas stream.

The flexible coupling travel limiter 42 can comprise a cylinder having an inlet 50 and an end 52, and a geometry such as cylindrical, circular, oval, hexagonal, and the like, with a geometry substantially similar to the geometry of the coupling assembly 30 preferred. The coupling travel limiter 42 can be concentrically disposed within the coupling assembly 30, and secured to the mounting flange 40 and/or to inlet 46 at end 50. End 52 preferably extends beyond the outlet 48 of the coupling assembly 30 and through a catalytic converter inlet (See FIG. 6). In order to enable the travel limiter 42 to engage the inner surface of the catalytic converter 10 and control the range of movement of the coupling assembly 30, the flared end 52 preferably has a diameter greater than the catalytic converter inlet diameter.

Figure 6:
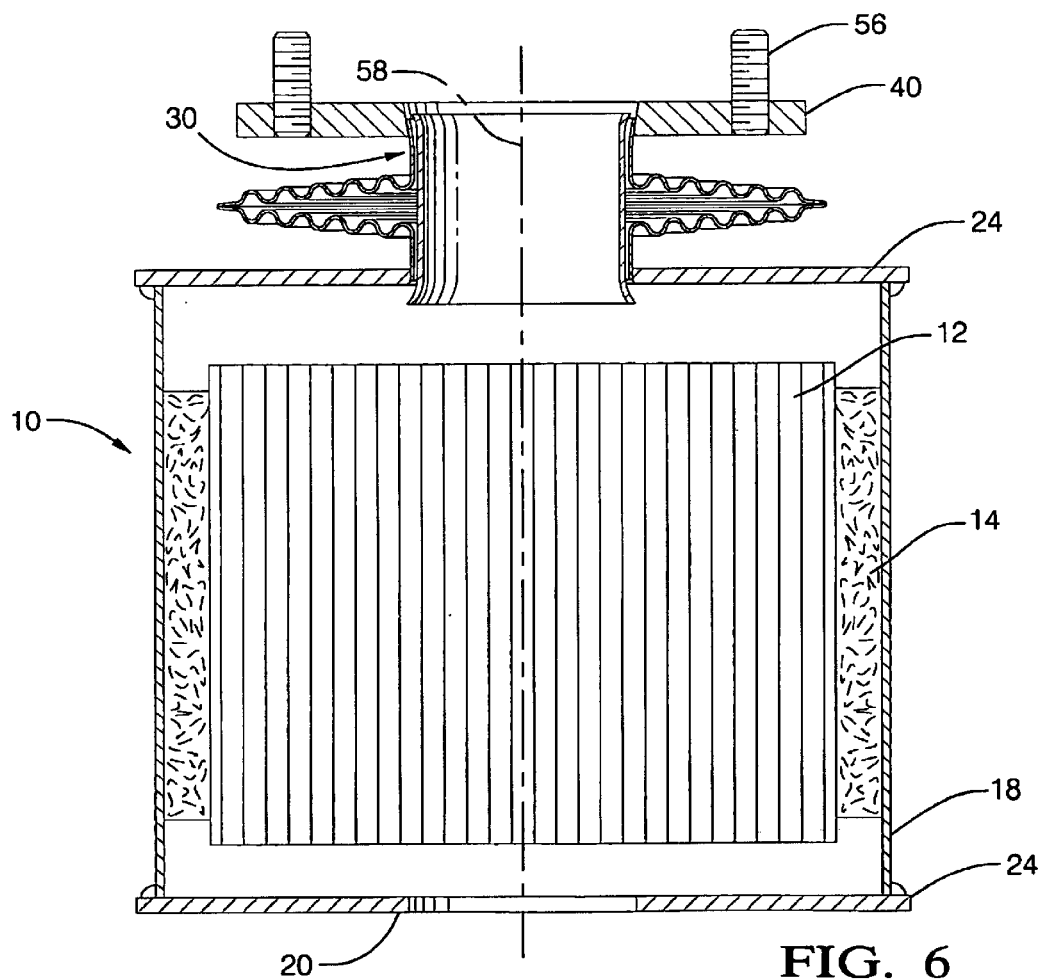
FIG. 6 is a cross-sectional view of an another exemplary embodiment of a catalytic converter mounted to a coupling assembly with a coupling travel limiter of the present invention.
Figure 7:
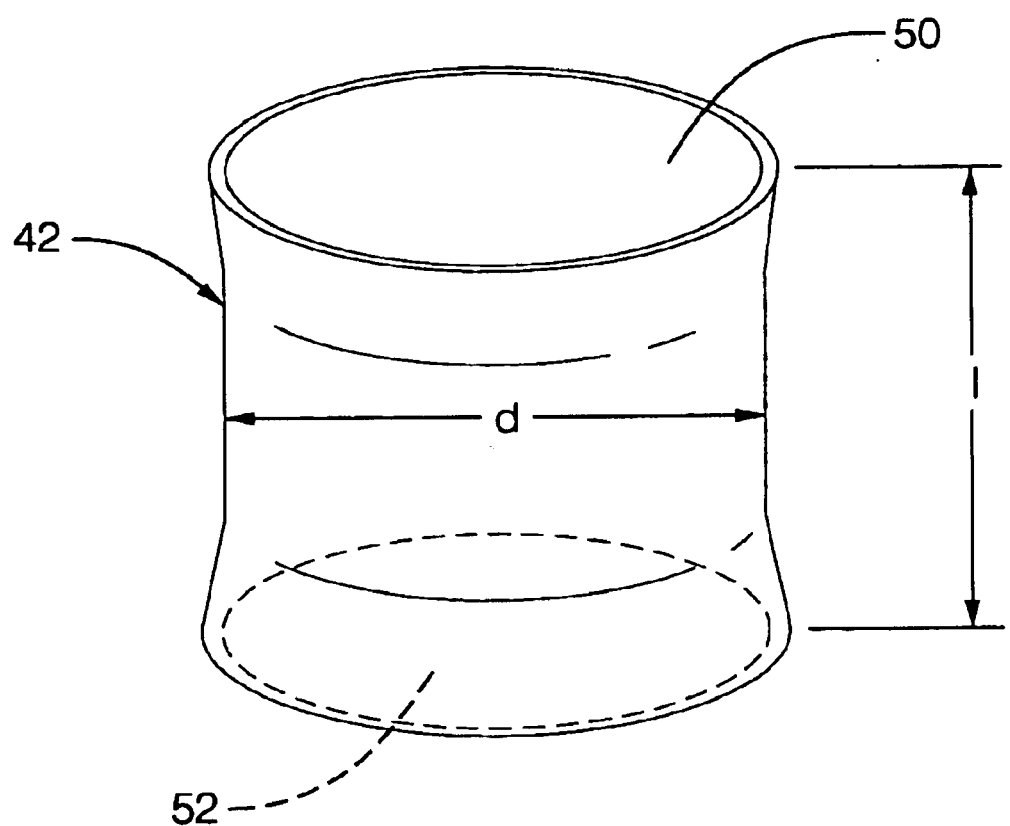
FIG. 7 is an isometric view of the coupling travel limiter of FIG. 6.

The coupling assembly's decreased amount of displacement can be approximated by the travel limiter's relative size, i.e. the diameter "d" and length "l" versus the size of the coupling assembly (See FIGS. 6–7). For instance, the travel limiter's length can be greater than the coupling assembly's length. The outwardly flared end 52 would then preferably extend beyond the outlet 48. When the flexible coupling assembly 30 moves linearly, the flared end 52 will contact the end of the outlet 48 and/or the inner surface of the catalytic converter 10, and prevent the coupling assembly's linear movement. In addition, as the outwardly flared end 52 extends into the catalytic converter, it preferably directs the exhaust gas stream into the catalyzed surface of the catalyst substrate.

The choice of material for travel limiter 42 depends upon the type of exhaust gas, the maximum temperature of the catalyst substrate, the maximum temperature of the exhaust gas stream, and the like. Suitable materials for travel limiter 42 can comprise any material that is capable of resisting temperature, thermal shock, oxidation and corrosion. Typically, a ferrous material is employed, as described in relation to the coupling assembly 30. The travel limiter 42 can preferably be formed and manufactured using conventional processes such as a sheet metal forming processes comprising rolling a piece of sheet metal into a circular tube, and using a sizing tool to outwardly flare end 52. Alternatively, an extrusion process can be employed as well to form the cylindrical travel limiter 42.

An integrated converter/coupling assembly can preferably be manufactured for a mobile vehicle's exhaust system by forming a catalyst substrate 12 comprising a catalyst such as by extrusion or other conventional process followed by deposition or other introduction of the catalyst. The mat support material 14 can be concentrically disposed around the catalyst substrate 12 with the combination then disposed concentrically within a shell 18 having an end 20. Meanwhile, a flexible coupling assembly 30 comprising a first bellow 34 with an inlet 46 and a plurality of undulating first ribs 44 concentrically radiating outward from the inlet 46 to a first periphery 38 is formed. A second bellow 36 comprising an outlet 48 and a plurality of undulating second ribs 44' concentrically radiating outward from the outlet 48 to a second periphery 38' is formed. The first flexible bellow 34 and the second flexible bellow 36 are secured at the first and second periphery 38, 38' to form a flexible coupling assembly 30 such that the inlet 46 and the outlet 48 are in fluid communication. The end of the shell 18 has an end plate 24 disposed there about which is secured to the outlet 48 of the flexible coupling assembly 30. Optionally, a travel limiter 42 can be concentrically disposed within the flexible coupling assembly 30. The flexible coupling travel limiter 42 can have an inlet 50 and an outwardly flared end 52.

Furthermore, the end 20 of the shell 18 can be attached to an end plate 24, or an endcone, or the like, which can be attached to outlet 48. The inlet 46 of the flexible coupling assembly 30 can be attached to a mounting flange 40, or a connecting pipe (not shown), such that the mounting flange or connecting pipe is in fluid communication with the coupling assembly 30. A plurality of securement members 56, such as a stud, screw, clamp, weld, bracket, and the like, can sealingly secure the coupling assembly 30 to the mounting flange 40. The mounting flange 40 can be attached to an exhaust manifold assembly, or an exhaust pipe, or an exhaust system component for a mobile vehicle, such that the exhaust manifold assembly, or exhaust pipe or exhaust manifold assembly is in fluid communication with the coupling assembly 30. The flexible coupling assembly is in fluid communication with both the exhaust system of the mobile vehicle and the catalytic converter. As vibrational and/or torsional forces, and/or engine roll acts upon the exhaust system, the flexible coupling assembly can absorb the forces by expanding/contracting in a linear movement along its axis 58, and rotating clockwise/counter-clockwise about its axis 58.

In an exemplary embodiment, during operation of a vehicle, the flexible coupling assembly 30 can preferably be fixedly attached in a stationary position to a mounting flange 40 at inlet 46. Exhaust system gases pass through the coupling assembly, into the catalytic converter where it is treated, and exits typically through a conduit. As forces are imparted upon the flexible coupling assembly 30, the assembly 30 can move linearly in the direction of either arrows 62 or 64. The first and second ribs 44, 44' can compress toward one another, e.g., in the opposite direction of arrows 62 and 64, and then move back in the direction of arrows 62 and 64, causing the coupling assembly 30 to move in a linear direction along its axis 58. The flexible coupling assembly 30 provides linear freedom of movement along an axis 58 of the assembly, and a limited freedom of movement perpendicular to and rotationally about its axis 58 (See FIGS. 1, 3, 5). The amount of linear freedom of movement can be up to about 25.40 mm (1.000 inch) in either direction, with up to about 6.35 mm (0.250 inches) preferred, and about 1.270 mm (0.050 inches) to about 2.540 mm (0.100 inches) especially preferred.

The integrated converter/coupling assembly disclosed herein provides an optimum combination of performance and efficient utilization of underhood or underbody space of the mobile vehicle. The converter/coupling assembly provides several advantages over conventional catalytic converters mounted to existing coupling assemblies. First, the coupling assembly can integrate easily with the existing end plate catalytic converter designs utilized today. The small, versatile coupling assembly can be fitted to conventional end plates and, likewise, to existing exhaust pipe designs, or a mounting flange, when necessary, to meet the requirements and specifications of the intended application. The low-profile circular configuration of the coupling assembly occupies the minimum amount of space along the axis of the catalytic converter assembly. Accordingly, the converter/coupling assembly can be utilized with existing catalytic converters and mounting requirements.

Second, the low profile design described herein eliminates components conventionally required and consequently is approximately one-third the size of conventional coupling assemblies. Due to its compactness the coupling assembly design described herein can be incorporated into exhaust systems where conventional coupling assemblies cannot fit.

Third, the coupling assembly disclosed herein is designed to overcome several disadvantages inherent in existing coupling assemblies. Conventional flex coupling assemblies adversely impact existing catalytic converter designs by restricting the exhaust gas stream flow entering the converter, increasing the mass of the exhaust system, increasing the cost of the exhaust system, and decreasing the packaging flexibility of the system. The coupling assembly disclosed herein can utilize a travel limiter, if necessary, in order to direct the flow of the exhaust gas stream entering the converter. The exhaust gas stream experiences less turbulence while entering the catalytic converter, which reduces the backpressure forming within the catalytic converter. The decrease in the backpressure causes an increase in the horsepower of the engine, and a more efficient fuel consumption. Further, the coupling travel limiter can also insulate the coupling assembly from the heat of the exhaust gas stream.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An integrated catalytic converter/flexible coupling assembly comprising:
    a first bellow comprising an inlet and a plurality of undulating first ribs concentrically radiating outward from the inlet to a first periphery;
    a second bellow comprising an outlet and a plurality of undulating second ribs concentrically radiating outward from the outlet to a second periphery, wherein the first flexible bellow and the second flexible bellow are secured at the first and second periphery to form a flexible coupling assembly such that the inlet and the outlet are in fluid communication; and
    a catalytic converter in physical contact and fluid communication with the outlet, wherein the catalytic converter comprises a shell concentrically disposed about a mat material which is concentrically disposed about a catalyst substrate comprising a catalyst.

2. The integrated catalytic converter/flexible coupling assembly recited in claim 1, the further comprising a travel limiter concentrically disposed within the coupling assembly, extending at least from a portion of the inlet to a portion of the outlet.

3. The integrated catalytic converter/flexible coupling assembly recited in claim 2, wherein the travel limiter is disposed from the outlet through a catalytic converter inlet, and wherein the travel limiter further comprises an outwardly flared end disposed in the catalytic converter.

4. The integrated catalytic converter/flexible coupling assembly recited in claim 3, wherein the flared end has a diameter greater than a catalytic converter inlet diameter.

5. The integrated catalytic converter/flexible coupling assembly recited in claim 1, wherein the inlet further comprises a first cylindrical portion extending from the first ribs opposite the second bellow.

6. The integrated catalytic converter/flexible coupling assembly recited in claim 5, wherein the outlet further comprises a second cylindrical portion extending from the second ribs to the catalytic converter.

7. The integrated catalytic converter/flexible coupling assembly recited in claim 1, wherein the first and second periphery include a joint configuration selected from the group consisting of a lap joint, a butt joint, a tee joint, and combinations comprising at least one of the foregoing joints.

8. The integrated catalytic converter/flexible coupling assembly recited in claim 1, further comprising a mechanical bond or weld disposed at the first and second periphery, wherein the mechanical bond is selected from the group consisting of a crimp, lockseam, and combinations comprising at least one of the foregoing mechanical bonds.

9. The integrated catalytic converter/flexible coupling assembly recited in claim 1, wherein the coupling assembly has an axis concentrically disposed through the inlet and the outlet, and wherein the coupling assembly is capable of moving linearly along the axis.

10. The integrated catalytic converter/flexible coupling assembly recited in claim 9, wherein the coupling assembly is capable of moving rotationally about the axis.

11. The integrated catalytic converter/flexible coupling assembly recited in claim 1, further comprising a mounting flange with at least one securement member, wherein the mounting flange is fixedly connected to the inlet and wherein the securement member is selected from the group consisting of a stud, screw, clamp, weld, bracket, and combinations comprising at least one of the foregoing securement members.

12. The integrated catalytic converter/flexible coupling assembly recited in claim 11, further comprising the mounting flange with an exhaust manifold assembly, or an exhaust pipe, or an exhaust system component, wherein said mounting flange is fixedly connected to the exhaust manifold assembly, or the exhaust pipe, or the exhaust system component.

13. The integrated catalytic converter/flexible coupling assembly recited in claim 1, further comprising a connecting pipe with at least one securement member, wherein the connecting pipe is fixedly connected to the inlet and wherein the securement member is selected from the group consisting of a stud, screw, clamp, weld, bracket, and combinations comprising at least one of the foregoing securement members.

14. The integrated catalytic converter/flexible coupling assembly recited in claim 13, further comprising the connecting pipe with an exhaust manifold assembly, or an exhaust pipe, or an exhaust system component, wherein said connecting pipe is fixedly connected to the exhaust manifold assembly, or the exhaust pipe, or the exhaust system component.

15. The integrated catalytic converter/flexible coupling assembly recited in claim 1, wherein the catalytic converter further comprises an endplate or an endcone concentrically disposed about one end of the shell, and connecting the catalytic converter to the outlet.

16. A method for manufacturing an integrated catalytic converter/flexible coupling assembly, comprising:
   forming a catalyst substrate comprising a catalyst;
   disposing the catalyst substrate concentrically within a shell having an end;
   disposing the mat support material concentrically in between the catalyst substrate and the shell to form a catalytic converter;
   forming a flexible coupling assembly comprising a first bellow with an inlet and a plurality of undulating first ribs concentrically radiating outward from the inlet to a first periphery, and a second bellow comprising an outlet and a plurality of undulating second ribs concentrically radiating outward from the outlet to a second periphery, wherein the first flexible bellow and the second flexible bellow are secured at the first and second periphery such that the inlet and the outlet are in fluid communication; and
   securing the catalytic converter to the outlet of the coupling assembly.

17. The method recited in claim 16, wherein the end to the catalytic converter further comprises an endplate or an endcone about the end of the shell such that the endplate or the endcone is secured to the outlet.

18. The method recited in claim 16, further comprising securing the inlet to a mounting flange or a connecting pipe.

19. The method recited in claim 18, further comprising securing the mounting flange or the connecting pipe to an exhaust manifold assembly, or an exhaust pipe, or an exhaust system component.

20. The method recited in claim 16, further comprising disposing concentrically a travel limiter within the coupling assembly, through at least a portion of the inlet and a portion of the outlet.

21. The method recited in claim 20, further comprising disposing a flared end of the travel limiter within the end of the catalytic converter.

* * * * *